Feb. 24, 1970 K. H. BARUCH 3,497,299
HIGH SPEED OPTICAL PRINTING HEAD
Filed April 17, 1967 3 Sheets-Sheet 1

Kurt H. Baruch,
INVENTOR.
BY.

GOLOVE & KLEINBERG,
ATTORNEYS.

Feb. 24, 1970  K. H. BARUCH  3,497,299
HIGH SPEED OPTICAL PRINTING HEAD
Filed April 17, 1967  3 Sheets-Sheet 2

Feb. 24, 1970  K. H. BARUCH  3,497,299
HIGH SPEED OPTICAL PRINTING HEAD
Filed April 17, 1967
3 Sheets-Sheet 3
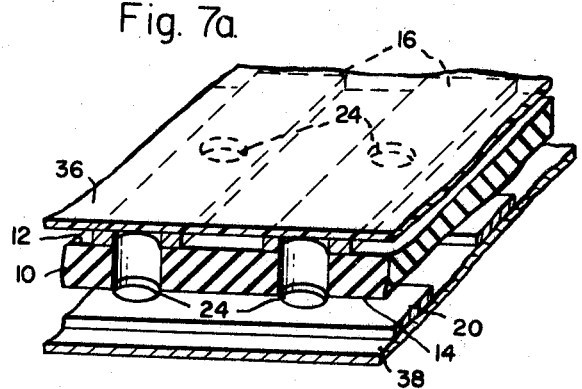
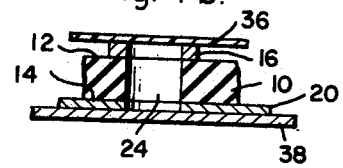
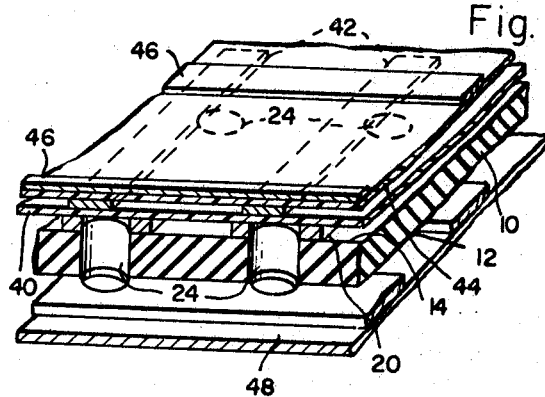
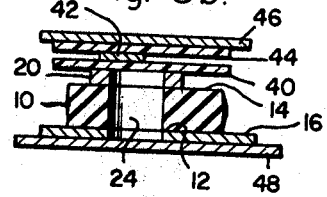
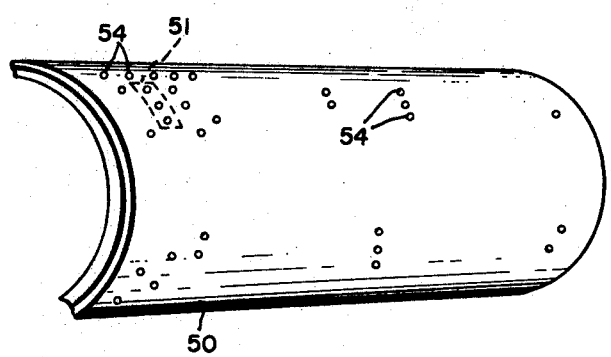
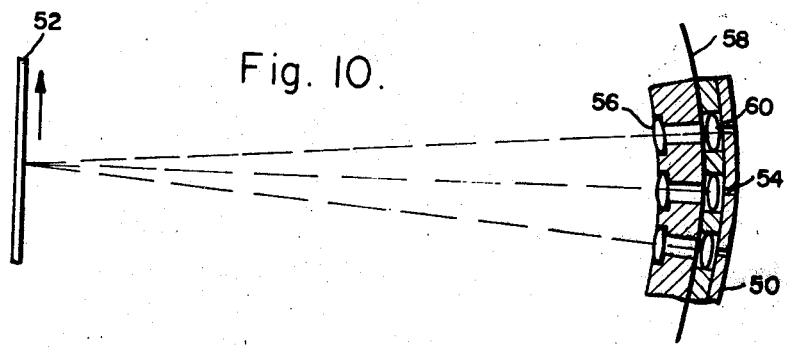

United States Patent Office 3,497,299
Patented Feb. 24, 1970

3,497,299
HIGH SPEED OPTICAL PRINTING HEAD
Kurt H. Baruch, Los Angeles, Calif., assignor to Hycon
Mfg. Company, Monrovia, Calif.
Filed Apr. 17, 1967, Ser. No. 631,544
Int. Cl. G03b 27/54, 21/26
U.S. Cl. 355—70                                   12 Claims

ABSTRACT OF THE DISCLOSURE

An array of selectively actuable miniature light sources for utilization in optical printing. Each light source is actuated by the generation of an electric arc through an aperture in a thin insulating plate, the aperture providing an arcing path between conductive elements which are concurrently energized. The conductive elements are formed of longitudinal members, positioned on each side of the insulating plate in a manner such that the orthogonal projection of the conductor on one side of the insulating plate intersects the conductor on the other side of the insulating plate at the location of one of the apertures. The array is utilized in an optical printer having extremely high printing speeds, as well as in a high speed camera data block which can be operated under various atmospheric conditions.

---

This invention relates to optical printing apparatus, and more particularly to selectively actuable miniature light sources for exposing selected portions of a photosensitive surface.

Many situations require high speed printing devices for rapidly recording supplied information. For example, computer operations are often delayed by inability of the output printer to keep up with the availability of computer output information. Computer output printers, therefore, must be capable of printing data at high speeds.

Another situation requiring high speed printers involves the applying of photographic legends in high speed photography. For example, in aerial cameras, a strip of photographic film is positioned in the camera focal plane for exposure by a terrain image. After exposure, the exposed film strip (or frame) is replaced by an unexposed frame for exposure by another terrain image. Many such frames are exposed in rapid succession to obtain photographs of overlapping portions of the terrain. Information concerning the individual photographs, such as is necessary for identification and reference purposes, must be applied to each of the photographs to assure their maximum usefulness. A convenient method of applying data to the photographs is to print the pertinent information onto a portion of each photograph during camera operation.

One method of high speed recording involves applying the information to a photosensitive material, such as photographic film or paper, by exposing selected portions of the photosensitive material to produce thereon patterns of interpretable characters or drawings. Such "optical printing" methods have been applied to computer output devices and to high speed camera devices for rapidly recording supplied information.

For example, data can be optically applied to each photograph taken by a high speed camera immediately before, during or immediately after exposure of each frame. A "camera data block" may be utilized, which is an optical printing head for exposing selected portions of the film, preferably within an area of the film format not included by the terrain image, such as the margin or a corner of the photograph. The camera data block must be capable of applying different information to succeeding photographs.

Briefly, described, apparatus according to the present invention provides an array of selectively actuable miniature light sources, adapted to transmit light therefrom to a photosensitive surface. When selected light sources of the array are actuated, corresponding portions of the photosensitive surface are exposed to produce thereon graphic symbols or drawings representing the supplied information. The light sources are capable of producing light emanations of extremely short duration, of the order of a microsecond, permitting their utilization with high speed information supply systems. An array of such light sources has particular application as a recording head of an optical printer, and as a camera data block, both of which are included within the scope of the present invention.

Describing the light sources further, a thin, electrically insulating member is provided, such as a thin plate or shell of high dielectric strength. A plurality of first electric conductors of narrow width and having a longitudinal dimension, are secured to one surface of the dielectric member, and the conductors are positioned substantially parallel to each other. Each of the first conductors is adapted to be selectively coupled to a first source of electrical energy.

A plurality of similar second electric conductors are secured to the opposite surface of the dielectric member, but are arranged to be nonparallel to the first conductors so that the orthogonal projection of each of the second conductors (i.e. an imaginary line on the first surface of the dielectric member, orthogonally projected from a second conductor) uniquely intersects each of the first conductors. For example, in one configuration, the second conductors are positioned on the second surface of the dielectric member such that they are orthogonal to the first conductors on the second surface. Each of the second conductors is adapted to be selectively coupled to a second source of electrical energy.

At each point of "intersection" of first and second conductors (i.e. an intersection of a first conductor with an orthogonal projection of a second conductor), an aperture extends at least through a first conductor and the dielectric member, "exposing" a second conductor to a first conductor. By utilizing suitable selection techniques, a particular conductor on each side of the dielectric member is concurrently energized to create a voltage difference in the aperture at the intersection. This voltage difference is sufficient to cause an electric arc to be generated between the selected first and second conductors within the aperture, producing a flash of light in the aperture. If the apertures penetrate the second conductors, the light emanating from the generated arcs appears at both surfaces of the dielectric member. If, however, the apertures do not penetrate the second conductors, or if the second surface is covered with an opaque material, the light emanations appear at the first surface only.

It can be appreciated that a photosensitive surface may be positioned so as to be exposed by the selected light sources, providing a data pattern thereto. The individual light sources "seen" by the photosensitive surface are the electric arcs which extend in a direction approximately perpendicular to the photosensitive surface. Each arc, therefore, provides a point source of light for selectively exposing sufficiently "slow" photographic media. In most applications, however, the photographic media is sufficiently "fast" so that the exposed portions conform to the cross sectional contour of the aperture.

Character means can be provided for defining the boundaries of each of the light sources to produce graphic symbols on the photosensitive media. For example, a mask having cutout characters may be positioned such that a character is interposed between the photosensitive media and a light source, for producing various graphic symbols such as alpha-numeric characters.

Projection means may also be provided for receiving light emanating from each of the selected light sources and for projecting the light to particular positions on the photosensitive media. Character means may be utilized in combination with the projection means, in which case the projection means projects the selected characters to particular positions on the photosensitive media.

It is an object of the present invention to provide apparatus for generating point sources of light.

It is another object of the present invention to provide apparatus which can be utilized to expose selected portions of a photosensitive surface in order to produce thereon intelligible optical patterns.

It is a further object of the present invention to provide ultra miniature light sources arranged in an array such that one or more of the light sources may be actuated by suitable selection apparatus.

It is still a further object of the present invention to provide an array of selectively actuable miniature light sources comprised of electric arcs which are generated at selected locations.

It is yet another object of the present invention to provide an array of ultra miniature light sources which can be utilized in a camera data block.

It is still another object of the present invention to provide apparatus for generating miniature light sources for utilization in an optical printer.

It is another object of the present invention to provide an array of ultra miniature light sources for utilization as an optical printing head for recording information upon photosensitive media, without the necessity of relative motion between the media and the head.

It is a further object of the present invention to provide an array of ultra miniature light sources which can be utilized as an optical printing head for the exposure of selected portions of photographic media for producing graphic symbols and drawings thereon.

It is a still further object of the present invention to provide a camera data block which can be positioned relative to the film format to apply data to the film simultaneously with the exposure to an image.

It is still another object of the present invention to provide an array of selectively actuable miniature light sources which have an extremely short response time.

It is a further object of the present invention to provide an array of selectively actuable miniature light sources which is very compact in size.

The novel features which are believed to be characteristic of the invention together with further objects and advantages thereof will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

FIG. 7a is a cross sectional, perspective view of a portion of a configuration of the preferred embodiment of FIG. 1, for hermetically sealing the light sources;

FIG. 7b is a cross sectional view of a portion of the configuration shown in FIG. 7a in the vicinity of an aperture;

FIG. 8a is a cross sectional, perspective view of a portion of a configuration of the preferred embodiment of FIG. 1, for transmitting the information being recorded to a remote station;

FIG. 8b is a cross sectional view of a portion of the configuration shown in FIG. 8a in the vicinity of an aperture;

FIG. 9 is a perspective view of a configuration of an optical printing head utilizing an array of miniature light sources according to the present invention; and FIG. 10 is a cross sectional view of a portion of the optical printing head indicated by the dashed enclosure in FIG. 9.

Figure 1:
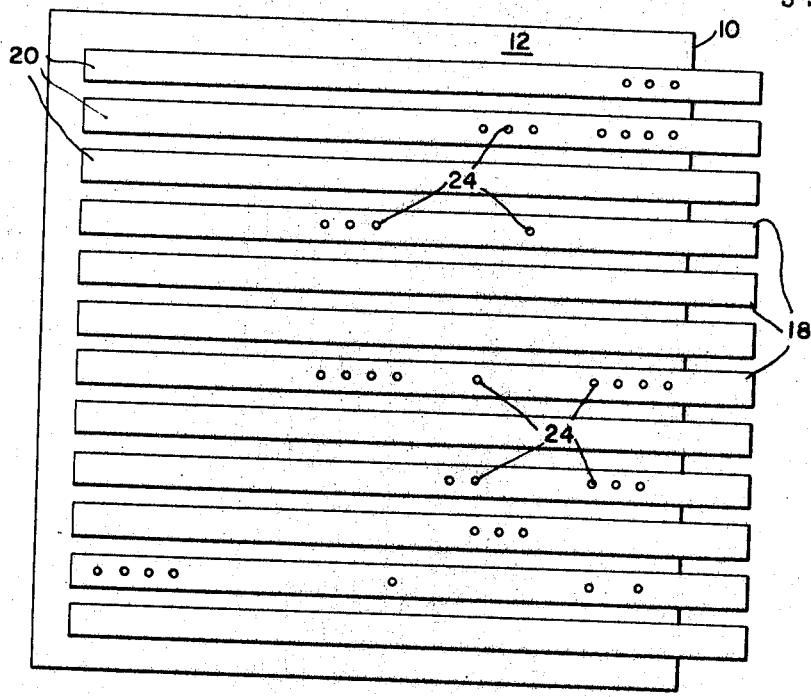
FIG. 1 is a plan view of an obverse surface of a preferred embodiment of an array of miniature light sources according to the present invention.
Figure 2:
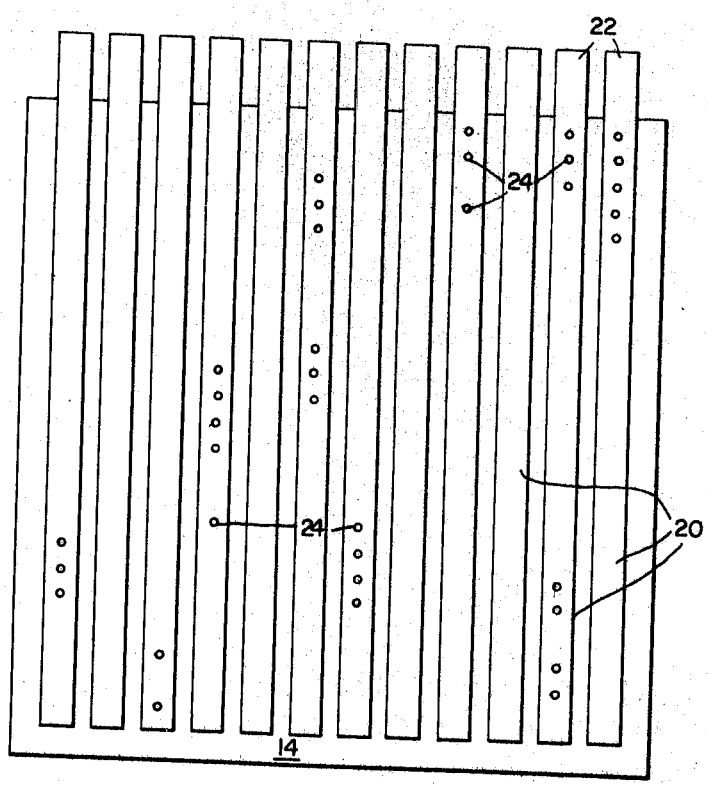
FIG. 2 is a plan view of a reverse surface of the preferred embodiment of FIG. 1.
Figure 3A:
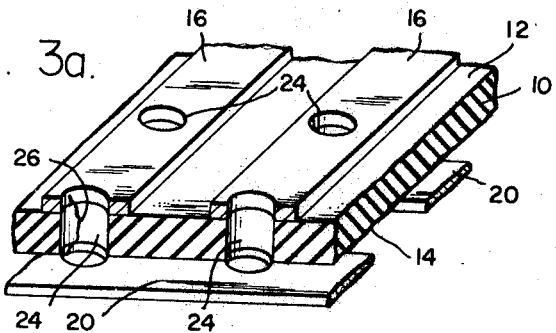
FIG. 3a is a part sectional, perspective view of a portion of the preferred embodiment of FIG. 1.
Figure 3B:
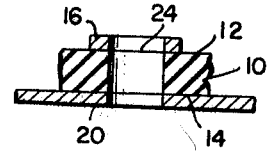
FIG. 3b is a cross sectional view of a portion of the preferred embodiment in the vicinity of an aperture.

The preferred embodiment of the present invention is best described by concurrent consideration of FIGS. 1, 2 and 3. A dielectric member 10, which may be a planar sheet or a curved shell of high dielectric strength material, has a first obverse surface 12 and a second, reverse surface 14. These obverse and reverse surfaces are substantially parallel to each other so that the dielectric member 10 has a substantially uniform thickness, which may be less than one mil if desired.

A plurality of first longitudinal conductors 16 are positioned on the obverse surface 12 of the dielectric member 10, and each of the first longitudinal conductors is adapted to be selectively coupled to a first source of electric energy. For example, each of the first longitudinal conductors may be provided with a connector tab 18, and each connector tab is adapted to be connected to a first potential source such as a positive voltage (not shown) through suitable selection techniques which are well known to the art.

Similarly, a plurality of second longitudinal conductors 20 are positioned upon the reverse surface 14 of the dielectric member 10, and connector tabs 22 can be provided for connecting the second longitudinal conductors to a second potential source through suitable selection techniques. The second potential source may be a negative voltage source (not shown).

The second longitudinal conductors 20 are positioned upon the reverse surface 14, such that the orthogonal projection of each of the second conductors 20 uniquely intersects each of the first longitudinal conductors 16. In the preferred embodiment, the first conductor 16 and the second conductors 20 are arranged so that they are mutually orthogonal.

At each "intersection" of a first conductor 16 with a second conductor 20, a hole or aperture 24 extends through a first conductor 16, the dielectric member 10, and a second conductor 20. Accordingly, an array of apertures 24 is provided, and each aperture 24 causes a first conductor 16 to be "exposed" to a second conductor 20.

In operation, one of the first longitudinal conductors 16 is selectively coupled to the first potential source (for example, a positive voltage source), while one of the second longitudinal conductors 20 is selectively coupled to the second potential source (for example, a negative voltage source). When the two selected conductors are thus concurrently energized, a critical voltage difference is created between them. The aperture 24 permits the formation of a spark discharge between the conductors, or the generation of an arc. A typical arc path 26 is indicated in FIG. 3a.

The arc thus generated provides a source of light which is ultra miniature in dimensions. The intensity of the arc may be controlled within limits by controlling the thickness of the dielectric and, to a very limited extent, by controlling the magnitude of the voltage difference applied between the two selected conductors. Further, the total amount of light provided in the aperture 24 can be controlled by the time duration of the applied critical voltage.

Conventional matrix selection techniques may be utilized to actuate the miniature light sources selectively. For example, the first conductors 16 may be sequentially coupled to the first potential source through a sequential switching circuit such as a ring counter. If desired, a number of light sources may be simultaneously actuated by coupling appropriately selected second conductors 20 to the second potential source concurrently with the energization of the selected first conductor.

The dielectric member 10 should be made of a material which is heat resistant, and which resists charring and discoloration in the presence of electric arcs. Ceramic materials (both crystalline and vitreous) may be utilized, for example, as well as high dielectric, heat resistant, plastic and plastic-glass materials.

One method of manufacturing the preferred embodiment is by utilization of standard printed circuit production techniques. The copper cladding on a doubly clad circuit board can be etched to produce both sets of longitudinal conductors. An aperture 24 is drilled or punched at each "intersection" of the first and second conductors 16, 20.

The "packing density" of each of the light sources, and the diameter of the apertures 24 are determined by the particular application for which the unit is employed. For example, when used as a camera data block, the apertures 24 may be on 0.030 inch centers. In such a case, one configuration of the preferred embodiment utilized apertures 24 having a diameter of 0.010 inch. Conductor widths of 0.020 were provided, with 0.010 inch spacings between adjacent conductors. Other packing densities, and different aperture diameters, are of course possible. When the array of miniature light sources is utilized for the projection of a character in an optical alpha-numeric printer, a packing density of 10 apertures per inch is generally sufficient.

Although the apertures 24 extend through the second conductors 20 in the preferred embodiment, these extensions of the apertures 24 through the second conductors 20 are not essential for arc generation so long as each of the apertures 24 provides a low dielectric path between a first conductor 16 and a second conductor 20.

Figure 4A:
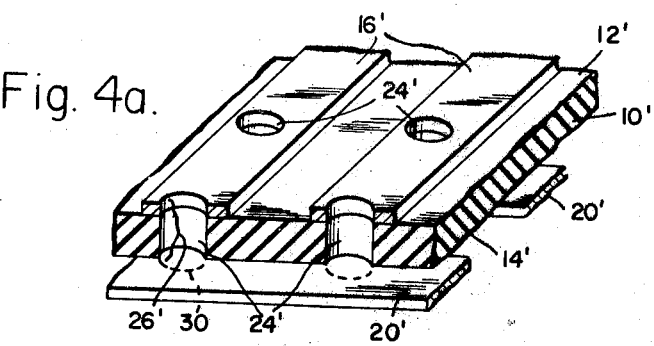
FIG. 4a is a part sectional, perspective view of a portion of a first alternative embodiment of an array of miniature light sources according to the present invention.
Figure 4B:
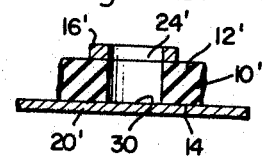
FIG. 4b is a cross sectional view of a portion of the first alternative embodiment in the vicinity of an aperture.
Figure 5A:
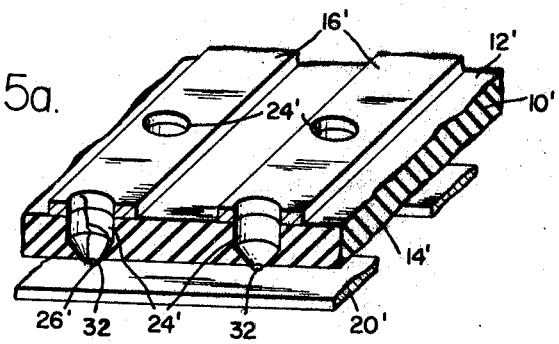
FIG. 5a is a part sectional, perspective view of a portion of a second alternative embodiment of an array of miniature light sources according to the present invention.
Figure 5B:
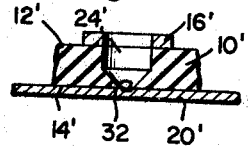
FIG. 5b is a cross sectional view of a portion of a second alternative embodiment in the vicinity of an aperture.
Figure 6A:
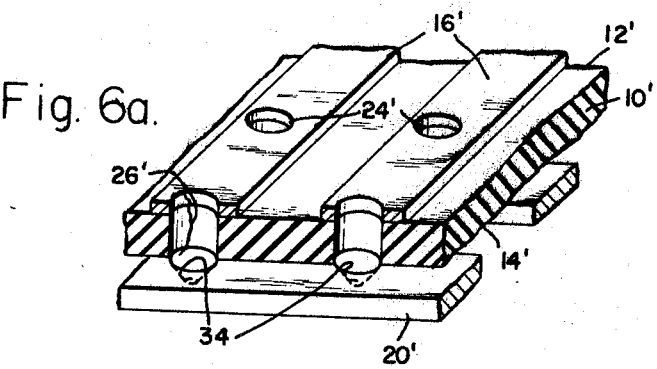
FIG. 6a is a part sectional, perspective view of a portion of a third alternative embodiment of an array of miniature light sources according to the present invention.
Figure 6B:
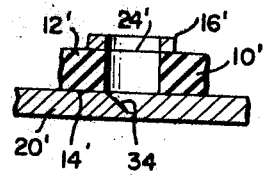
FIG. 6b is a cross sectional view of a portion of the third alternative embodiment in the vicinity of an aperture.

For example, fragments of alternative embodiments of an array of selectively actuable miniature light sources according to the present invention are presented in FIGS. 4, 5 and 6, in which primed reference numerals indicate components corresponding to similarly referenced components of FIG. 3. In each of these alternative embodiments, first conductors 16' with apertures 24' extending therethrough are arranged on a first, obverse surface 12' of a thin, high dielectric member 10' (such as a plate or shell), as in FIG. 1. Similarly, second conductors 20' are arranged on a second, reverse surface 14' of the member 10', as in FIG. 2, although the apertures 24 indicated in FIG. 2 as extending through the second conductors 20 are not provided in these alternative embodiments.

In a first alternative embodiment of FIG. 4, for example, the apertures 24' extend through the first conductors 16' and the dielectric member 10', but not through the second conductors 20'. A low dielectric path is therefore provided in each aperture 24' between a first conductor 16' and an arcing area 30 of a second conductor 20', each arcing area 30 being confined within a different aperture 24'.

In one method of manufacturing the first alternative embodiment, utilizing standard printed circuit production techniques, copper cladding on a singly-clad circuit board may be etched to produce the first conductors 16' attached to the first surface 12' of the dielectric member 10'. The apertures 24' are then drilled or punched at each prospective "intersection," and copper is applied to the reverse surface 14' of the dielectric member 10'. The applied copper is thereupon etched to produce the second conductors 20'.

Turning to FIG. 5, fragments of a second alternative embodiment show each aperture 24' extending through a first conductor 16' and the dielectric member 10', but only partially through a second conductor 20'. An arcing surface 32 having a diameter substantially less than the aperture diameter is therefore provided on a second conductor 20' within each aperture 24' and is centered with respect to the cross sectional contour of the aperture. In operation, this second alternative embodiment will cause the arc path 26' to seek the cross sectional center of each aperture 24', and is particularly useful when larger diameter apertures are provided.

The second alternative embodiment may be manufactured by etching a doubly clad circuit board to produce the first and second conductors 16', 20', and then drilling through the first conductor 16' and the dielectric member 10' until the arcing surfaces 32 are exposed. The conically shaped portion of each aperture 24' may be provided by utilizing a similarly shaped drill.

A third alternative embodiment is shown in FIG. 6, which is similar to the second alternative embodiment of FIG. 5 except that a larger arcing surface 34 of a second conductor 20' is provided. This third alternative embodiment may be manufactured in a similar manner to the method utilized in the second alternative embodiment, and the extent of the arcing surface 34 may be controlled by the drilling depth.

In each of the alternative embodiments, the arcing surfaces on the second conductors 20' may be bright plated in order to reflect the light produced by the arcs. For example, in the first alternative embodiment of FIG. 4, the arcing areas 30 may be bright plated with a low vapor pressure metal. Similarly, the arcing surfaces 32 of FIG. 5, and the arcing surfaces 34 of FIG. 6, may be plated.

In addition to providing a reflective function, the bright plating serves a protective function in that it tends to prolong the useful life of the conductors in the vicinity of each aperture. Other arcing surfaces can therefore be plated, in all embodiments of the array of light sources, such as the arcing surfaces of both first and second conductors in the vicinity of each of the apertures.

With respect to all embodiments, a front view of each arc may be recorded on photosensitive media such as photographic film, or alternatively, a "spot" or circle conforming to the cross sectional configuration of the selected aperture may be recorded, by proper selection of the exposure speed of the photographic film. It should be noted that the arrays of selectively actuable miniature light sources according to the present invention, although useful in many types of optical systems, each comprise a camera data block when properly situated in a camera and coupled to appropriate means for selectively actuating the light sources. In operation, the light emanating from the light sources is sufficiently intense to penetrate the anti-halation backing used on most films, so that the data block may be positioned on either side of the film.

Most types of films useful in high speed cameras are sufficiently "fast" so that the light sources expose areas thereon which conform to the aperture cross sections.

In this respect, the apertures can be made with extremely small diameters, so that a camera data block, for example, can be made to record "points" of light on films having ordinary exposure speeds. A large quantity of data can thus be recorded on a restricted area of the film, for example, by utilization of binary code. Diagrams may also be recorded, such as graphs or other graphic representations containing information which is changeable from frame to frame. In addition, a mask may be positioned between the array of light sources and the film, for printing alpha-numeric characters on the film.

The arrays of light sources may be hermetically sealed for efficient operation in various atmospheres, such as corrosive, humid, and pressurized atmospheres. For example, fragments of a hermetically sealed configuration of the preferred embodiment is shown in FIG. 7, in which many reference numerals indicate similarly referenced components in FIG. 3. A transparent non-conductive material, such as the material sold under the trademark "Mylar" in the form of a sheet 36, is bonded to the first conductors 16 so as to seal the apertures 24. Similarly, a non-conductive material, such as second Mylar sheet 38, is bonded to the second conductors 20, so as to seal the apertures 24. The second Mylar sheet 38 may have a light reflective capability, and may be aluminized, for example, for this purpose. The hermetically sealed apertures 24 can be filled with air or an inert gas at any practical pressure, either above or below atmospheric.

In addition, the apertures of the alternative embodiments shown in FIGS. 4, 5 and 6 may be hermetically sealed by bonding a transparent, non-conductive material to the first conductors 16'.

Means may be provided for transmitting the information being recorded by the array of light sources to a remote station. In FIG. 8, for example, there are shown portions of the preferred embodiment of FIGS. 1, 2 and 3, adapted to transmit the information being recorded, in which many reference numerals indicate components similarly referenced in FIG. 3. A transparent, non-conductive material, such as a first sheet of Mylar 40, is bonded to the second conductors 20, and strips of a photoelectric material are arranged thereon so as to cover a portion of each aperture 24 in the second conductors 20. Additional transparent, non-conductive material, such as a second sheet of Mylar 44, covers the first strips 42 of photoelectric material, and an array of second strips 46 of a photoelectric material is provided thereon which covers another portion of the apertures 24 in the second conductors 20. The first and second strips 42, 46 can be arranged in similar fashion to the arrangement of the first and second conductors 16, 20, so that when an arc is generated in a selected aperture a particular first strip and a particular second strip are each exposed to the light emanating from the selected aperture. The electric energy thereby produced in each of the particular first and second strips is thereupon transmitted to a remote station, and may be used, for example, to control selection in a second array of light sources (not shown).

If desired, the apertures 24 may be hermetically sealed by bonding a transparent, non-conducting material, such as a third sheet of Mylar 48, to the first conductors 16.

In certain applications it is desirable that the light sources conform to a curved surface, such as a section of a cylindrical shell. In FIG. 9, for example, an optical printing head is shown, which utilizes a curved array of miniature light sources 50. A cross sectional view of a fragment of the optical printing head indicated by the dashed enclosure 51 in FIG. 9, is shown in FIG. 10 together with a side view of a strip of photographic film 52. This example of an optical printing head may best be described by consideration of both FIGS. 9 and 10.

The array of miniature light sources 50 may be similar to any of the embodiments previously described. The light emanating from each selected aperture 54 in a particular annular sector is projected by projecting means, such as a plurality of projection lenses 56, to a particular location on the film 52. In an alpha-numeric printing head, character means is further provided, such as a mask 58 having cut-out characters positioned between the light source array 50 and the projection lenses 56. Alphanumeric characters are therefore projected upon the photographic film 52.

If desired, collimating means may be additionally provided, such as condenser lenses 60, each interposed between a light source 54 and a cut-out character of the mask 58.

The characters on the mask 58 in any one annular sector will be projected onto the same location on photographic film 52 whenever any one or more light sources 54 in the sector are actuated. The number of light sources 54 in a sector, therefore, corresponds to the number of different characters desired, and the number of annular sectors corresponds to the number of characters or spaces desired in a line of print.

In operation, a character in each sector is printed on the film 52 by selecting and actuating the appropriate light sources 54. After a complete line has been printed, the film 52 may be caused to move in the direction of the arrow for indexing the film to print a succeeding line. Alternatively, the film 52 may be caused to move at a constant rate so that the film will be self indexing with respect to time.

An example of an application of the optical printing head shown in FIGS. 9 and 10, is its utilization in a computer output device. Connected to a magnetic tape memory, for example, it can perform extremely fast conversion to printed tape. In another application, the film 52 can be replaced by the drum of an electrostatic printing device, for "depositing" information directly on the drum for subsequent print-out.

Thus, there has been shown several embodiments of an array of miniature light sources which are selectively actuable, and which can be utilized as an optical printing head. Other embodiments of the present invention and modifications of the embodiments herein presented may be developed without departing from the essential characteristics thereof.

Accordingly, the invention should be limited only by the scope of the claims appended below.

What is claimed as new is:

1. An array of selectively actuable miniature light sources, comprising the combination of:
   a dielectric member having a first and second surface substantially parallel to each other;
   a plurality of first longitudinal conductors positioned on said first surface, each of said first conductors adapted to be selectively coupled to a first source of electrical energy;
   a plurality of second longitudinal conductors positioned on said second surface such that the orthogonal projection of each of said second conductors uniquely intersects at least one of said first conductors, each of said second conductors adapted to be selectively coupled to a second source of electrical energy; and
   a plurality of apertures, each aperture positioned at a different intersection of said projections with said first conductors and extending at least through a first conductor and said dielectric member, such that an electric arc is generated directly between a selected first conductor and a selected second conductor in the aperture positioned at and passing through the intersection of said selected first conductor wtih the orthogonal projection of said selected second conductor, said electric arc extending from said first surface to said second surface.

2. An array of selectively actuable miniature light sources according to claim 1, above, wherein the orthogonal projection of each of said second conductors uniquely intersects each of said first conductors.

3. An array of selectively actuable miniature light sources according to claim 1, above, wherein said first conductors are orthogonal to said second conductors.

4. An array of selectively actuable miniature light sources according to claim 1, above, further including transparent material covering said apertures.

5. An array of selectively actuable miniature light sources according to claim 1, above, wherein said apertures extend through said second conductors.

6. An array of selectively actuable miniature light sources according to claim 1, above, wherein said apertures extend through said conductors, and further including light reflective material covering said apertures at said second conductors.

7. An array of selectively actuable miniature light sources according to claim 1, above, wherein said apertures extend through said second conductors, and further including light reflective material covering said apertures at said second conductors, and transparent material covering said apertures at said first conductors.

8. An array of selectively actuable miniature light sources according to claim 1, above, further including projection means adapted to receive light emanating from each of said light sources, for projecting said light to selected positions on a particular surface.

9. An array of selectively actuable miniature light sources according to claim 1, above, further including character means adapted to receive light emanating from each of said light sources, for defining the boundaries of said light into graphic symbols.

10. An array of selectively actuable miniature light sources according to claim 1, above, further including:
character means adapted to receive light emanating from each of said light sources, for defining the boundaries of said light into graphic symbols; and
projection means adapted to receive light emanating from said character means, for projecting each of said characters to selected positions on a particular surface.

11. An array of selectively actuable miniature light sources according to claim 1, above, further including:
collimating means adapted to receive light emanating from each of said light sources, for collimating said light;
character means adapted to receive the collimated light from said collimating means, for defining the boundaries of said collimated light into graphic symbols; and
projection means adapted to receive light emanating from said charatcer means, for projecting each of said characters to selected positions on a particular surface.

12. An array of selectively actuable miniature light sources as in claim 1, above, further including photoelectric means for receiving light emanating from each of said electric arcs and producing an electric signal indicating the existence of particular ones of said arcs.

References Cited

UNITED STATES PATENTS

| | | | |
|---|---|---|---|
| 2,858,480 | 10/1958 | Shadowitz | 315—169 |
| 2,931,027 | 3/1960 | Blefary et al. | 353—36 X |
| 3,264,074 | 8/1966 | Jones | 315—169 |

NORTON ANSHER, Primary Examiner

WAYNE A. SIVERTSON, Assistant Examiner

U.S. Cl. X.R.

353—36